United States Patent [19]

Melle et al.

[11] 4,370,439

[45] Jan. 25, 1983

[54] METHOD OF PREPARING A SIZING COMPOSITION FOR TREATING GLASS FIBERS

[75] Inventors: Carl A. Melle, Gibsonia; Donald E. McWilliams, Pittsburgh; Balbhadra Das, Allison Park, all of Pa.

[73] Assignee: PPG Industries, Inc., Pittsburgh, Pa.

[21] Appl. No.: 22,673

[22] Filed: Mar. 22, 1979

[51] Int. Cl.³ .............................................. C08L 67/06
[52] U.S. Cl. ................................... 524/513; 428/378; 524/501; 524/539; 524/601; 525/445; 525/446
[58] Field of Search .................. 260/29.2 E, 29.2 M, 260/29.2 UA, 862, 29.6 NR; 525/446; 528/38; 428/375; 524/513, 539, 601

[56] References Cited

U.S. PATENT DOCUMENTS

| | | | |
|---|---|---|---|
| 2,763,573 | 9/1956 | Biefeld | 117/72 |
| 2,931,739 | 4/1960 | Marzocchi et al. | 117/126 |
| 2,951,772 | 9/1960 | Marzocchi et al. | 117/126 |
| 3,045,036 | 7/1962 | Jex et al. | 260/448.2 |
| 3,081,195 | 3/1963 | Biefeld et al. | 117/126 |
| 3,207,623 | 9/1965 | Marzocchi et al. | 117/126 |
| 3,228,903 | 1/1966 | Dennis | 260/29.6 |
| 3,249,411 | 5/1966 | McWilliams et al. | 65/3 |
| 3,252,825 | 5/1966 | Marzocchi et al. | 525/61 |
| 3,350,345 | 10/1967 | Vanderbilt et al. | 260/41.5 |
| 3,414,432 | 12/1968 | Mertzweiller et al. | 117/126 |
| 3,464,942 | 9/1969 | Hathwar | 260/22 R |
| 3,709,846 | 1/1973 | Tsou | 260/18 EP |
| 3,920,596 | 11/1975 | Furukawa | 260/22 R |
| 3,922,466 | 11/1975 | Bell et al. | 428/388 |
| 3,923,708 | 12/1975 | Furukawa et al. | 260/29.2 UA |
| 3,936,285 | 2/1976 | Maaghul | 65/30 |
| 4,004,062 | 1/1977 | Peterson | 260/29.2 E |
| 4,009,132 | 2/1977 | Furukawa et al. | 260/29.2 E |
| 4,029,623 | 6/1977 | Maaghul | 260/29.2 E |
| 4,038,243 | 7/1977 | Maaghul | 260/40 R |
| 4,067,835 | 1/1978 | Takamori et al. | 260/22 R |
| 4,122,074 | 10/1978 | Pepe et al. | 526/26 |

OTHER PUBLICATIONS

Article "Improved Silane Containing Sizes for Polyolefin Compatible Reinforcement" by James Marsden, 1970, (pp. 1–5, Sect. 16C), 25th Annual Technical Conference Reinforced Plastics/Composites Div. of the Society of the Plastics Industry, Inc.

Primary Examiner—Theodore E. Pertilla
Attorney, Agent, or Firm—Kenneth J. Stachel

[57] ABSTRACT

A method is provided for producing a more stable emulsion of a polyester resin having carboxyl functionality and an amino-functional silane coupling agent that is incorporated into a sizing composition for treating glass fibers. The method involves reacting the polyester resin having carboxyl functionality with the amino-functional silane at ambient temperatures and atmospheric pressure then diluting the reaction product of the polyester resin and silane to obtain a more stable emulsion. The emulsion is then incorporated into a sizing composition by the addition of typical sizing additives to produce a more stable sizing composition.

45 Claims, No Drawings

METHOD OF PREPARING A SIZING COMPOSITION FOR TREATING GLASS FIBERS

BACKGROUND OF THE INVENTION

The present invention is related to a method of preparing an emulsion of a polyester resin having free carboxyl groups either pendant and/or terminal and an amino-functional silane. The emulsion is used alone or with other additives to function as a sizing composition for glass fibers. In the sizing composition the polyester resin functions as a film-former and the silane functions as a coupling agent.

In manufacturing glass fiber strands, a multitude of fine glass filaments are combined to yield the glass fiber strand. These fine glass filaments are formed by the rapid attenuation from molten cones of glass at the tips of small orifices in a bushing, for example, as in the operation shown in U.S. Pat. No. 2,133,238. In order to protect the glass filaments from interfilament abrasion, the filaments are coated during their formation with a sizing composition to protect the glass fiber strand against handling equipment during further processing and to give the glass fiber strand integrity and workability for any standard textile or reinforcement use. After the filaments have been treated with the sizing composition and gathered together into a strand the glass fiber strand is wound around a rapidly rotating drum to form a package.

Sizing compositions for use in treating glass fibers usually contain a lubricant, which provides the protection for the glass fiber strand; a film-former or binder that gives the glass fiber strand integrity and workability; a coupling agent that provides better adhesion between the glass fiber strand and the polymeric materials that are reinforced with the glass fiber strand; and other additives. The lubricant assists in imparting wet-out and allowing good contact between the polymeric material that is to be reinforced with the glass fibers and the glass fibers. The film-former should be water soluble or water emulsifiable and must be non-sensitive to water after curing. The art has developed a number of film-formers for use with different polymeric materials that are to be reinforced with glass fibers. Examples of these film-formers include polyesters, polyvinyl pyrrolidones, epoxy resins, polyamides, polyacrylates, polyvinyl alcohols, starches and the like. The coupling agent can be a Werner complex compound or an organo-silicon compound. Usually the coupling agent is a silane coupling agent that has a hydrolyzable moiety for bonding to the glass and an organic reactive moiety that is compatible with the polymeric material that is to be reinforced with the glass fibers. The lubricant, film-former, and coupling agent can be a single compound or a mixture of two or more compounds. One recognized problem of the use of organo silane compounds as coupling agents in sizing compositions is their tendency to rapidly hydrolyze in aqueous media to form corresponding silanols and siloxanes. The rapid hydrolysis of the silane in a sizing composition which contains a film-former can lead to the coagulation and precipitation or settling out of the film-former or hydrolyzed silane or both.

One solution to this problem was proposed in U.S. Pat. No. 3,922,466 (Bell et al) wherein the silane coupling agent was prepared by reaction of a mercapto silane with a carboxylic acid anhydride whereby the mercapto group added across the double bond of the anhydride. The reaction is carried out in the presence of an amino catalyst and the resultant silane coupling agent is formulated into a glass fiber sizing composition usually containing a polyester resin and water. The silane coupling agent prepared in this manner reacts with water in the size to form the corresponding diacid which is further hydrolyzed in the size to form the corresponding silanols and polysiloxanes.

It has recently been suggested by the art to utilize a polyester resin having pendant carboxyl groups alone or in addition to other polyester resins in a sizing composition for treating glass fibers. The presence of the pendant carboxyl groups make the polyester resin more water soluble or dispersible in the sizing composition and provides a glass fiber strand with good wet-out properties. The presence of the excess carboxyl functionality of the polyester resin necessitates care in synthesis in order to avoid crosslinking by condensation. Typically in sizing compositions one or more silane coupling agents are used. A silane coupling agent that has been used to promote adhesion between the glass and the polymeric materials for which the glass fibers are used as reinforcement has been an amino functional silane. It is known in the art that amino functional silanes have a tendency to hydrolyze more rapidly than other types of silanes. Conventionally silane coupling agents are usually added to a sizing composition in an aqueous medium in order to facilitate hydrolysis so that the silanes are in the proper chemical form to attach to the glass fibers. When the amino silane is added in the conventional manner, i.e. after complete hydrolysis in an aqueous medium, to a sizing composition containing a polyester resin with pendant carboxyl groups the resultant sizing composition has a stability problem. The sizing composition is not stable for long periods of time because a portion of the sizing composition coagulates and eventually settles out.

It is an object of the present invention to provide a method of producing a more stable sizing composition that contains a polyester resin having free carboxyl groups either pendant and/or terminal and an amino silane.

It is a further object of the present invention to provide a sizing composition that contains a single component to perform the function of the film-former and the coupling agent.

An additional object of the present invention is to provide a method for making a sizing composition and a sizing composition wherein the coupling agent is more efficiently used.

It is a further additional object of the present invention to provide a method of preparing a composition and the composition wherein the formation of dimer polymers of the coupling agent is inhibited.

A further additional object of the present invention is to provide a method of producing a sizing composition wherein the coupling agent has been controllably hydrolyzed.

SUMMARY OF THE INVENTION

These and other objects of the invention are accomplished by producing a sizing composition for glass fibers where a polyester resin having free carboxyl groups either pendant, or pendant and terminal, or terminal is combined with an unhydrolyzed or partially hydrolyzed silane coupling agent containing amino functionality. The method of producing the emulsion containing the polyester resin with free carboxyl groups and the amino functional silane comprising, first, adding unhydrolyzed or partially hydrolyzed amino-functional silane to the polyester resin having the pendant and/or terminal unreacted carboxyl groups along the polymer chain, and second diluting the resulting mixture to the desired solids content. The sizing composition can then be made by adding other sizing additives to the mixture of polyester resin with pendant and/or terminal carboxyl groups and amino silane or by adding this mixture to other sizing additives.

A polyester resin film-former with free unreacted pendant and/or terminal carboxyl groups can be used in the form of a bulk polymer or in a concentrated solution with less than 90 percent water or with an organic solvent which is removed from the sizing composition before treating glass fibers. The polyester resin can be made from any of the known polyester-resin-forming compounds such as anhydrides and organic acids reacted with hydroxyl-containing compounds like glycols, wherein one or more additional carboxyl groups are present on the polyester-forming compound or the hydroxyl-containing compound. The polyester resin may be formed from a mixture of polyester forming compounds wherein one of the compounds contains the additional carboxyl group and/or a mixture of hydroxyl containing compounds that may or may not contain additional carboxyl groups. In addition the polyester resin may contain small quantities of unreacted reactants.

The unhydrolyzed or partially hydrolyzed silane with the amino functionality can be any of the amino-functional silanes known to those skilled in the art for use in glass fiber sizing compositions. The amino silane is used in the unhydrolyzed or partially hydrolyzed state. In the past amino silanes were usually hydrolyzed before addition to the polyester resin film-former so that the silanol compound was readily available for bonding to the surface of the glass fibers. The present invention recognizes the fact that stability problems are caused in the sizing composition when fully or substantially fully hydrolyzed silanes with amino-functionality are added to the polyester resin containing pendant and/or terminal carboxyl groups in an aqueous medium. In the unhydrolyzed state the amino-functional silane does not contain hydroxyl groups attached to the silicon atom. In the partially hydrolyzed state, it is meant that the silane has been contacted with an aqueous solution for a short period of time before being combined with the polyester resin, and a mixture of silanes is obtained where a majority of the silanes have no more than two hydroxyl groups attached to the silicon atom. When the silicon atom is not attached to hydroxyl groups, the groups that are attached to the silicon atom are alkoxy radicals having from 2 to 5 carbon atoms. The unhydrolyzed or partially hydrolyzed amino-functional silane may be a mixture of amino-functional silanes that are unhydrolyzed or contain less than three hydroxyl groups attached to the silicon atom.

The polyester resin and the amino-functional silane in the unhydrolyzed or partially hydrolyzed state are gnerally contacted at the conditions of temperature and pressure and in reaction vessels that are well known to those skilled in the art in producing sizing compositions. The temperature is generally around room temperature from about 18° C. to 50° C. and the pressure is usually at atmospheric pressure. The condition that is well-known to those skilled in the art that cannot be used in contacting the polyester resin with the amino-functional silane is any condition that would favor the production of the fully hydrolyzed amino-functional silane before the polyester resin and the amino-functional silane can react. In addition when the amino-functional silane is partially hydrolyzed and the polyester resin is in an aqueous solution, the polyester resin should be concentrated in the aqueous solution wherein the solids content of the resin is at least around 30 weight percent. In general, the larger the number of hydroxyl groups attached to the silicon atom, the more concentrated the polyester resin should be in order to limit the opportunity of the partially hydrolyzed silane to achieve full hydrolyzation before the amino functionality of the silane has reacted with the free carboxyl groups of the resin to form a salt.

In producing the sizing composition, the mixture of polyester resin film-former having the free carboxyl groups either pendant and/or terminal and the unhydrolyzed or partially hydrolyzed amino-functional silane can be added to or have added to it other sizing additives. These additives can function as film-former modifiers, wetting agents, anti-static agents, additional coupling agents, additional film-formers, stabilizers etc. that are well known in the art. When additional additives such as another film-former or film-former modifier that is a polyester resin is added to the size composition, an amount of the unhydrolyzed or partially hydrolyzed amino-functional silane may be added in all or in part to the additional polyester resin while the remaining amount or all of the silane is added to the polyester resin with free pendant and/or terminal carboxyl groups. Generally the proportions of all the additives including film-former polyester resin having free pendant and/or terminal carboxyl groups and the unhydrolyzed or partially hydrolyzed amino-functional silane used in the sizing composition of the present invention are those proportions that are known in the art. The total solids content of the sizing composition can range from about 5 to about 40 weight percent.

When the mixture of the polyester resin having free pendant and/or terminal carboxyl groups and unhydrolyzed or partially hydrolyzed amino-functional silane is diluted to the desired solids content, the dilution can be performed by the addition of water to the mixture or by adding solutions of additional sizing additives to the mixture or by adding the mixture to water or solutions of additional sizing additives. The dilution should be performed not too long after the polyester resin having free pendant and/or terminal carboxyl groups and unhydrolyzed or partially hydrolyzed amino-functional silanes are mixed together. But, the dilution should not be performed too rapidly so as to favor the hydrolysis reaction of the amino-functional silane over the reaction of the amino-functional silane with the polyester resin having free pendant and/or terminal carboxyl groups.

DETAILED DESCRIPTION OF THE INVENTION

It is believed but the method and composition of the present invention is not limited by this belief that the method and composition are based on the different rates of reaction occuring between the reaction of the amino-functional silane and the polyester resin having additional pendant and/or terminal carboxyl-functionality and the hydrolysis reaction of the unhydrolyzed or partially hydrolyzed amino-functional silane with water. When an amino-functional silane is added to a polyester resin in the usual manner of producing a sizing composition, the hydrolyzed amino-functional silane is added to the polyester resin. In this manner of addition the amino-functional silane has hydroxyl groups attached mostly to three of the positions on the silicon atom so that the amino-functional silane is actually an amino-functional silanol. The hydroxyl groups that are attached to the silicon atom through the hydrolysis reaction and that are necessary in order to bond the coupling agent to the glass surface may react with each other to form dimer compounds of amino-functional silanes or silanols. Then the amino groups of the dimer silane or silanol can react with the carboxyl groups of the polyester resin to form a macromolecule that will precipitate out of solution. This precipitaton will cause the size composition to be unstable and also is an inefficient use of a silane compound, since the silanol compounds are attached to each other rather than being available for bonding with the glass surface.

In order to overcome the stability problem caused by the coagulation of the macromolecules, it is further believed, but the method and composition of the present invention is not limited by this belief, that the amino-functional silane should preferentially react with the free pendant and/or terminal carboxyl-functionality of the polyester resin before the silane is fully hydrolyzed so that the silicon atom has the maximum amount of hydroxyl groups attached to it. Since amino-functional silanes are far more susceptible to hydrolysis than the alkoxy silanes, it is believed that by reacting the amino-functional silane in the unhydrolyzed or only partially hydrolyzed form with the polyester resin having additional or free pendant and/or terminal carboxyl functionality the stability of the emulsion formed and the stability of the sizing composition will be improved.

It is further believed that this reaction will decrease the opportunity of the hydroxyl group, if any on the silane molecule, to react with other hydroxyl groups, if any, on a silane molecule to form the silane dimers. It is also believed that the reaction product is a silylated polyester resin that can perform the functions of a film-former and a coupling agent in a sizing composition for glass fibers. The silylated polyester resin film-former will not be as large a molecule as a silylated dimer polyester resin molecule and therefore will not precipitate or coagulate out of solution. It is believed that the reaction between the unhydrolyzed or partially hydrolyzed silane and the polyester resin containing the free pendant and/or terminal carboxyl functionality is a type of acid base reaction between positively and negatively charged atoms that occurs around room temperature at atmospheric pressure. After the reaction product is formed to a substantial degree, the reaction product should be diluted with an aqueous solution. This dilution will favor the full hydrolysis of the silane portion of the silylated polyester resin reaction product and will also decrease the opportunity of any hydroxyl groups formed during the hydrolysis to come in contact with each other to form a dimer macromolecule.

The polyester resin of the method and composition of the present invention is a polyester resin or resins having free pendant and/or terminal carboxyl functionality. This means that the polyester resin can have carboxyl functionality at the end of the polymer chain and therefore have a terminal carboxyl functionality which polyester resins have to some extent by definition, or that the resin can have carboxyl functionality that is pendant along the polymer chain or that the resin can have both pendant and terminal carboxyl functionality. Also the polyester resin can be a polyester resin system that has a combination of polyester resins wherein one polyester resin may have terminal carboxyl functionality while another polyester resin has pendant and terminal carboxyl functionality.

A polyester resin with pendant and/or terminal carboxyl functionality can be formed from carboxylic acids and polyhydric alcohols by techniques known to those skilled in the art. In all cases, however, an ethylenically unsaturated carboxylic acid or anhydride such as maleic anhydride, maleic acid, fumaric acid or the like must be a major component in the formation of the polyester resin in order to impart the necessary adhesive characteristics for use with glass fibers and reinforced polymeric materials. A typical polyester resin having pendant and/or terminal carboxyl functionality has a polycarboxylic acid having more than two carboxyl groups per molecule as a component in the synthesis of the resin. Therefore, because a portion of the carboxylic acids employed in the synthesis of the polyester resin having a functionality of greater than two (2), a substantial amount of free carboxyl groups will be available along the polyester resin chain. Typical polyhydric alcohol which are used in the synthesis of the polyester resin include ethylene glycol, diethylene glycol, propylene glycols, dipropylene glycols and butylene glycols, glycerol, erythritol, sorbitol, 1, 2-propylene glycol and related polyethylene and ethylene glycols.

The excess carboxyl functionality of the polyester resin necessitates care in its synthesis in order to avoid cross-linking by condensation. The acid functional polyester resin is condensation polymerized to a point near its gel or cross-linking point so that when the glass fiber strand with the size thereon is subjected to heat the polyester resin will condensation crosslink with itself or other hydroxyl functionality present in the solids of the sizing composition. Typically, trimellitic anhydride or trimellitic acid is used in the synthesis of the polyester resin along with maleic anhydride and a polyhydric alcohol to obtain the solubilization and condensation cross-linkable properties of the polyester resin. Further, other saturated dicarboxylic acids may be used in the condensation of the polyester resin, however, only a minor amount of the difunctional saturated dicarboxylic acid may be used. This is to assure that no substantial detraction of unsaturation or pendant and/or terminal carboxylation in the polyester resin is obtained which will detract from the water solubility and condensation cross-linking properties of the final sizing solution or composition.

In addition to the afore-described polyester resin which may be used alone in the reaction with the unhydrolyzed or only partially hydrolyzed amino-functional silane another polyester resin may be used in combination with the afore-described polyester resin as a polyester resin system. This second polyester resin which is water dispersible is formed from maleic, fumaric or the like previously mentioned unsaturated carboxylic acids or anhydrides and a polyhydric alcohol such as those previously discussed. Further, non-free radically polymerizable dicarboxylic acids may be utilized in the synthesis of the polyester resin in a mole ratio which does not detract from the capability of the polyester resin to bond the glass with the polymeric material to be subsequently applied to the surface of the glass fibers. This polyester resin is produced with components and by methods well known to those skilled in the art to yield a polyester resin which has carboxyl functionality on the terminal portion of the polyester resin chain.

When two or more polyester resins having pendant and/or terminal carboxyl functionality are used as a polyester resin system for addition with the unhydrolyzed or only partially hydrolyzed amino-functional silane, the polyester resins can be combined with the amino-functional silane in several ways. All or part of the amino-functional silane could be added to one of the polyester resins in the polyester resin system and this combination could be added to the other polyester resin. Also the amino-functional silane could be added to the combined polyester resin system having one or more polyester resins. When two polyester resins are used in the polyester resin system, it is preferred that the first polyester resin has pendant carboxyl functionality and is a water soluble polyester resin while the second polyester resin is a water dispersible polyester resin that is insoluble in the first polyester resin and contains terminal free carboxyl functionality. In this case it is typical to have the first water soluble polyester resin incorporated in the sizing composition in an amount from about 1 to about 10 percent by weight of the total solids. The second polyester resin is typically incorporated at a level of about 1 to about 10 percent by weight of the sizing composition. This is opposed to a sizing composition that contains only one polyester resin present in an amount of about 1 to about 20 percent by weight of the total solids in the sizing composition.

In this polyester system the solubilization of the first water soluble polyester resin is accomplished by means of the addition of a volatile amine which is capable of forming a salt with the pendant and/or terminal carboxyl groups of the polyester chain. Typically, triethyl amine, dimethyl ethanol amine, ammonia and the like can be utilized in solubilizing the polyester resin proving the solubilizing agent can be dissociated from the sizing composition and evaporated at acceptable curing temperatures and times, i.e. 120° to 177° C. from about 2 to 24 hours. The curing time and degree of curing of the polyester resin can be adjusted by the selection of the nitrogenous base used to solubilize the polyester resin. A high boiling amine, i.e. dimethyl ethanolamine, will require substantial time and temperature to fully dissociate from the strand, hence if complete cure of the size is not desired complete dissociation of the amine will not be conducted. If a low boiling solubilizing base e.g. ammonia, is used, cure times and temperatures can be substantially reduced.

The polyester resin or polyester resin system can be reacted with the unhydrolyzed or only partially hydrolyzed amino-functional silane when the polyester resin is in bulk form or in a concentrated solution. When in bulk form the polyester resin or resin system would preferably be reacted with the amino-functional silane after the polyester resin is melted to obtain a liquid. Care should be taken in the melting of the polyester resin and the subsequent addition to the amino-functional silane so that the temperature necessary to maintain the polyester resin in liquid form is not such a high temperature as to degrade the amino-functional silane. It is preferred that the polyester resin or polyester resin systems be combined with the unhydrolyzed or only partially hydrolyzed amino-functional silane when the polyester resin or resin systems are in a concentrated solution. In order to favor the reaction between the silane and the polyester the solution of the polyester resin or resin systems must contain less than 90 percent by weight water. It is also preferred that the polyester resin or resin system solution contain more than 10 percent by weight water to favor the solubility of the polyester resin or resins.

The amino-functional silane coupling agent is one that can be designated by the general formula:

$$NH_2R\text{-}Si\text{-}(OR_2)_3$$

wherein R is an alkylene radical having from 2 to 8 carbon atoms and $R_2$ is a lower alkyl radical or hydrogen; the lower alkyl radical having 1 to 5 carbon atoms, preferably 1 to 2 carbon atoms. Also, it is within the scope of the method and composition of the present invention to use a combined coupling agent system wherein two coupling agents are used and both are preferably silanes. The first coupling agent would be the one described above and the second silane coupling agent has a reactive moiety which is free radically polymerizable such as acrylate, methacrylate, alkyl, vinyl or the like. A particularly advantageous arcylate coupling agent is gamma-methacryloxypropyltriethoxysilane. However, other unsaturated coupling agents such as vinyl triethoxysilane, vinyl trimethoxysilane and the like may be utilized as the second coupling agent. A particularly advantageous amino-functional silane is gamma-aminopropyltrimethoxysilane. Typically each silane coupling agent is present in the sizing composition in an amount of about 0.1 to about 5 percent by weight based on the total weight of the sizing composition and in an amount of 0.1 to 10 parts per hundred parts of resin in the emulsion of resin and silane.

It is preferred that the amino-functional silane coupling agent is in the unhydrolyzed state when it is combined with the polyester resin or polyester resin system. But it is within the scope of the present invention to have the amino-functional silane partially hydrolyzed so that less than three positions on the silicon atom contain hydroxyl groups. When the partially hydrolyzed amino-functional silane is used care must be taken to limit the amount of water present in the polyester resin or polyester resin system when the silane is combined with the resin system. By using unhydrolyzed or only partially hydrolyzed amino-functional silanes in combination with the polyester resin or polyester resin system having carboxyl functionality and a limited amount of water present, a controlled hydrolysis of the amino-functional silane occurs that reduces the amount of dimer silanol compound produced. The controlled hydrolysis occurs because the reaction between the polyester resin or polyester resin system and the amino-functional silane is favored over the silane hydrolysis reaction thereby yielding a silanated polyester resin reaction product. The reaction product is then diluted to effect the hydrolysis of the silane portion of the reaction product and to reduce the concentration of the solution to discourage formation of the silane dimer product. With the dilution of the reaction product an emulsion of the silylated polyester resin is formed. This emulsion is stable for long periods of time because of the reduced amount of silane dimer present in the emulsion that thereby reduces the possibility of coagulation or precipitation of macromolecules from the emulsion.

The emulsion of the silylated polyester resin reaction product may contain additional additives conventionally used in sizing compositions for treating glass fibers and is further combined with additional additives to produce a sizing composition for treating glass fibers that are to be used to reinforce polymeric materials. The sizing composition is produced in accordance with the production of the emulsion of polyester resin or resins with the unhydrolyzed or partially hydrolyzed silanes. By this it is meant that when the additives to produce a sizing composition are added in the course of producing the said emulsion, then the emulsion is the sizing composition. In addition the additives to produce a sizing composition can be added to the emulsion of the polyester resin and unhydrolyzed or partially hydrolyzed silane. In all cases, the sizing composition has a final pH that encourages stability of the size. Additives that may be incorporated in the emulsion include a second silane coupling agent and/or a second polyester resin as previously mentioned and also include a plasticizer and emulsifying agent. Generally the plasticizers are incorporated into the emulsion or into the size composition, in an amount necessary to give an amount in the size composition of about 2 to about 10 percent by weight based on the total size composition. A particularly advantageous plasticizer is tricresyl phosphate. Other plasticizers known to those skilled in the art may be utilized so long as they impart the necessary properties of flexibility and processability necessary to the glass fiber strand and the roving formed therefrom and to aid in the coalescence of the solids in the sizing composition. Typical of other plasticizers are dioctyl phthalate, dibutyl phthalate, ethyl ortho-benzol benzoate, and the like. The emulsifying agent can be any anionic, cationic, or non-ionic emulsifying agent known to those skilled in the art for use in sizing compositions for glass fibers. A particularly useful emulsifying agent is Abex 18S, an anionic emulsifier having a solids content of 35 plus or minus 1.70 and a pH of 7.5 to 8.5 at 25° C. which is sold by Alcolar Chemical Corporation.

Additives that can be added to the emulsion containing the polyester resin or polyester resin system and amino-functional silane includes such additives as a flexibilizing agent, film-former modifiers, wetting agents, stabilizers, etc., that are wellknown in the art. These additives can be added to the emulsion when the emulsion is diluted or added to dilute the emulsion. Generally the amounts of all the additives including the emulsion are those that are well-known in the art falling in the range of about 5 to about 17 weight percent total solids content of the sizing composition although higher amounts can be added.

Examples of thermoplastic polymers that may be used as additives in the method and composition of the present invention are those that are more fully described in U.S. Pat. No. 4,048,865, which is herein incorporated by reference. Typical thermoplastic pressure-sensitive polymers useful for incorporation into the sizing composition are the low molecular weight acrylic resins. These resins are synthesized from the homopolymerization, copolymerization or interpolymerization of methyl methacrylate, ethylacrylate, 2-ethyl-hexylacrylate, butylacrylate, styrene, vinylacetate and the like. Other thermoplastic polymers may be used so long as they provide a sufficient tack level to the glass fiber strand. One polymer has been found to be particularly useful in the size of the present invention is Paisley 76-3663 which is a vinyl acrylic copolymer emulsion supplied as a 50 percent plus or minus 2 percent water emulsion having an average particle size of 0.5 microns and a viscosity of 1500 to 2000 centipoises and a pH of 6 to 7. Another polymer that has been found to be particularly useful in the size composition of the present invention is Fuller X-8731 which is a polyvinyl acetate acrylic copolymer emulsion supplied by H. B. Fuller Company, St. Paul, Minnesota.

In the method of producing the emulsion containing the polyester resin or polyester resin system and the amino-functional silane and in producing the sizing composition, the polyester resin and the aminofunctional silane can be combined in several ways. The emulsion of the polyester resin or resins and unhydrolyzed or partially hydrolyzed silane can have a total solids content in an amount up to about 45 weight percent and the total solids of the sizing composition containing the emulsion is in the range of about 5 to about 40 weight percent.

In the preferred embodiment the amino-functional silane is added directly to a polyester resin having a terminal carboxyl functionality. Then the emulsifying agent and the plasticizer are added to water and the mixture of polyester resin and amino-functional silane is added to this aqueous solution containing emulsifying agents and plasticizer in an emulsification tank equipped with a high sheer Eppenbauch ® agitator or any other emulsification vessel known to those skilled in the art to form the emulsion. To this emulsion a polyester resin having free pendant and terminal carboxyl functionality that has been diluted is added. Also added to the emulsion is a hydrolyzed gamma-methacryloxypropyltrimethoxysilane with acetic acid. After the addition of the second silane, a polyvinyl acetate acrylic copolymer in water is added to the emulsion mixture to produce the sizing composition of the present invention. In the preferred embodiment as above described the dilution of the emulsion of polyester resin with carboxyl functionality and amino-functional silane is carried out by the addition of the emulsification agent and plasticizer and water.

In alternative embodiment the amino-functional silane is added in an unhydrolyzed state to a polyester resin having free pendant and terminal carboxyl functionality that is in an aqueous medium and then this mixture is added to an emulsion of a polyester resin having terminal carboxyl functionality and an emulsifying agent and plasticizer to form the emulsion of the polyester resin or polyester resin system with the aminofunctional silane. Then to this emulsion additives are incorporated to form the sizing composition of the present invention. In another alternative embodiment 75 percent by weight of the amino-functional silane is added to a polyester resin having terminal carboxyl functionality and this mixture is added to a mixture containing emulsifying agents and plasticizer in an aqueous medium in an emulsifying vessel equipped with a high shear Eppenbauch ® or the like. In the meantime a polyester resin having pendant and/or terminal carboxyl functionality is diluted in water and has added to it 25 percent by weight of the amino-functional silane that is to be present in the sizing composition, and after mixing this mixture is added to the emulsion of polyester resin with terminal carboxyl functionality and 75 percent amino-functional silane to produce the emulsion of the polyester resin system and amino-functional silane. To this emulsion additional additives are incorporated to produce the sizing composition of the present invention.

In another alternative embodiment the method is performed as in the preceding alternative embodiment except 50 percent by weight of the amino-functional silane to be present in the sizing composition is added to the polyester resin with terminal carboxyl functionality while the remaining 50 percent by weight is added to the polyester resin with pendant, or pendant and terminal carboxyl functionality.

In another alternative embodiment the method is performed according to the preceding alternative embodiment except 25 percent by weight of the amino-functional silane to be present in the sizing composition is added to the polyester resin having terminal carboxyl functionality while the remaining 75 percent by weight amino-functional silane is added to the polyester resin having pendant or pendant and terminal carboxyl functionality to yield the emulsion of the polyester resin system with the amino-functional silane. In all the embodiments it is preferred to add the amino-functional silane in the unhydrolyzed form and in a very slow addition.

In the preferred embodiment the mixture of polyester resin with carboxyl functionality and amino-functional silane is diluted by adding a mixture of emulsifying agents and plasticizer and water. The water that is used to dilute the mixture is that which is sufficient to hydrolyze the silane portion of the polyester resin and silane reaction product. In the alternative embodiments the dilution is carried out after all or a portion of the amino-functional silane has initially been added to the polyester resin or polyester resins system.

Additional dilution may be performed in order to give the desired solids content in the size composition. The method of producing the stable emulsion and the stable size composition of the present invention can be used to produce a sizing composition having a total solids content in the range of about 5 to about 17 weight percent and even a high solids composition having a total solids content of about 18 to about 40 weight percent.

The following examples that are illustrative of the preferred embodiment and alternative embodiments of the present invention will further elucidate the concept of the present invention.

In the following examples two polyester resins one with pendant and terminal carboxyl functionality and one with only terminal carboxyl functionality were used. The resin with pendant and terminal carboxyl functionality (hereinafter referred to as polyester A) was prepared in the following manner. Four moles of propylene glycol, 1 mole of maleic anhydride, and 1 mole of isophthalic acid were charged to a reaction vessel equipped with a stirrer, a heating apparatus, and inert gas inlet, a thermometer to determine the temperature of the reaction and a thermometer placed at the top of the distillation column to determine the temperature of the effluent from the reaction mixture. These ingredients were esterfied to an acid value of 8.2. One mole of trimellitic anhydride was added thereto and reacted with the above formed polyester until a cure time of less than 30 seconds at 220° C. was obtained. The resin was stoichiometrically neutralized with an aqueous triethyl amine solution. The final resin had an acid number of 57.2, a cure time of 28 seconds a non-volatile content of 60 30 percent, a Gardner-Holt viscosity of A-1 at 25° C., a Gardner color of 1 and a pH of 7.4. Of particular importance is the cure time of the final resin so that when such a resin is incorporated into a sizing composition and the fibers are sized therefrom, subsequent heating will condense the free carboxylic acid in the polyester resin. The cure time is determined by heating the polyester at 200° C. and measuring the time required for gelation.

Generally in the above type of polyester, an acid value of 30 to 90, preferably 40 to 60 is necessary to obtain proper solubilization and cross-linking of the sizing composition.

The polyester resin with the terminal carboxyl functionality (hereinafter referred to as polyester B) was synthesized in the conventional manner using six moles of maleic anhydride, four moles of phthalic anhydride, 10.5 moles of ethylene glycol, 0.2 mole of Carbowax ® 1540w, a high molecular weight polyethylene glycol. The components were condensed to an acid value between 18 and 26 and a Gardner viscosity of 0 to Q at 60 percent resin solids in ethyl Cellusolve ®. Seventy-five parts of the above polyester resin are mixed with 25 parts of ethyl Cellusolve ®, 0.1 part of 2,6-ditertiarybutyl paracresol as an antioxidant and 0.002 part of methyl quinone.

EXAMPLE I

A five gallon amount of sizing composition was prepared by charging 2,075 milliliters of water to a mix tank equipped with an agitator along with 90 grams of an anionic emulsifier (Abex 18S) and 90 grams of tricresyl phosphate (Phosphlex 179A), TCP. Added to this mixture was 1,085 grams of polyester resin B and the mixture was emulsified using an Eppenbauch ® agitator. Next, 5,860 grams of polyester resin A was added to 6,225 milliliters of water and 180 grams of unhydrolyzed, i.e. concentrated gammaaminopropyl-triethoxysilane (A-1100) was added to resin A in water. The mixture was mixed until the solution became clear and then added to the emulsion of polyester resin B, Abex 18S and TCP. To this amount there was added a mixture of hydrolyzed gamma-methacryloxypropyl-trimethoxysilane (A-174) prepared by adding 100 grams of A-174 to 1,500 milliliters of water which had added to it 3 drops of acetic acid. Also to the emulsion there was added 706 grams of a polyvinyl acetate acrylic copolymer (Fuller X-8731) in 1,000 milliliters of water to produce a sizing composition.

EXAMPLE II

A sizing composition was prepared by mixing 1,085 grams of polyester resin B with 180 grams of silane A-1100 which was then added to a mixture of 90 grams of Abex 18S and 90 grams of TCP in 6,225 grams of water that was then emulsified using the Eppenbauch stirrer. To this emulsion there was added 5,860 grams of polyester resin A in 2,075 milliliters of water. Also added to the emulsion was hydrolyzed silane A-174 made by adding 100 grams of A-174 to 1,500 grams of water with the addition of 3 drops of acetic acid. Also to the emulsion there was added 706 grams of X-8731 in 1,000 milliliters of water to give a sizing composition.

EXAMPLE III

Five gallons of a sizing composition were prepared by combining 5,588 grams of polyester resin A with 1,009 grams of polyester resin B 86 grams of Abex 18S and 86 grams of TCP 179A which was mixed for approximately 5 minutes then slowly added to water to emulsify. To this emulsion there was added 172 grams of concentrated silane A-1100 in unhydrolyzed form and the emulsion was mixed for 10 minutes or until the emulsion discolored. Preferably the emulsion is mixed for about 10 to about 60 minutes most preferably 30 minutes. To this emulsion mixture there was added 95 grams of hydrolyzed silane A-174 in water and 3 drops of acetic acid. Also added was 672 grams of copolymer X-8731 in water to produce the sizing composition having a final pH of about 7 and a total solids content of 15.5 percent.

EXAMPLE IV

Five gallons of a sizing composition were prepared in the following manner. An amount of 5,588 grams of polyester resin A was added to 12,000 grams of water. To this mixture there was added 180 grams of unhydrolyzed silane A-1100 and this mixture was mixed until the solution became an emulsion, i.e. about 25 minutes. To the emulsion there was added 95 grams of silane A-174 hydrolyzed in water and having added to it three drops of acetic acid. Also added to the emulsion was 672 grams of copolymer X-8731 in water to produce the sizing composition having a pH of 8.1 and a binder solids of 12.6 weight percent.

EXAMPLE V

Five gallons of a sizing composition were prepared in the following manner. Amounts of 1,085 grams of polyester resin B and 135 grams, 75 percent by weight of the total, of silane A-1100 in unhydrolyzed form were added together. This mixture was diluted by adding to a mixture of 90 grams of Abex 18S, 90 grams of TCP and 2,075 milliliters water. This dilution was emulsified using an Eppenbauch stirrer. Then 5,860 grams of polyester resin A were added to 6,225 milliliters of water. To this mixture there was added 45 grams of silane A-1100 in unhydrolyzed form, where the A-1100 was added very slowly to the resin. This combination was allowed to mix until the solution became clear, approximately 5 minutes, and then was diluted by adding to the emulsion. To the emulsion there was added hydrolyzed silane A-174 prepared by adding 100 grams of silane A-174 to 1,500 grams of water with the addition of three drops of acetic acid. Also added to the emulsion was 706 grams of copolymer X-8731 in 1,000 grams of water to produce a sizing composition.

EXAMPLE VI

A five gallon amount of sizing composition was prepared in the following manner. An amount of 1,085 grams of polyester resin B was combined with 90 grams of silane A-1100 in unhydrolyzed form. This combination was diluted by adding to an aqueous medium containing 90 grams of Abex 18S, 90 grams of TCP 179A and 2,075 milliliters of water. This mixture was emulsified using an Eppenbauch ® stirrer. Concomitantly, an amount of 5,860 grams of polyester resin A was added to 6,225 grams of water to which there was added 90 grams of silane A-1100 in unhydrolyzed form, where the addition was very slow. The combination was allowed to mix until the solution became clear, approximately 5 minutes, and then was diluted by adding to the emulsion. To the emulsion there was added hydrolyzed silane A-174 with acetic acid prepared by adding 100 grams of silane A-174 to 1,500 grams of water and 3 drops of acetic acid. Also added to the emulsion was 706 grams of copolymer X-8731 in 1,000 grams of water to produce a sizing composition.

EXAMPLE VII

Five gallons of sizing composition were prepared in the following manner. An amount of 1,085 grams of polyester resin B was combined with 45 grams of silane A-1100 in unhydrolyzed form. This mixture was diluted by adding to an aqueous medium containing 90 grams of Abex 18S, 90 grams of TCP 179A and 2,075 milliliters of water. The diluted mixture was emulsified using an Eppenbauch stirrer. Contemporaneously, an amount of 5,860 grams of polyester resin A was added to 6,225 grams of water and to which there was added very slowly 135 grams of silane A-1100 in unhydrolyzed form. The mixture was allowed to mix until the solution became clear, which was approximately 5 minutes, and then was diluted by adding to the emulsion. Added to the emulsion was an amount of hydrolyzed silane A-174 with acetic acid prepared by adding 100 grams of A-174 to 1,500 milliliters of water and 3 drops of acetic acid. Also added to the emulsion was 706 grams of copolymer X-8731 in 1,000 grams of water to produce the sizing composition.

The foregoing has described a method for producing a stable emulsion of a polyester resin having carboxyl functionality and an amino-functional silane which is then incorporated into a sizing composition for glass fibers. The polyester resin having carboxyl functionality can be a single polyester resin or polyester resin system having two or more polyester resins. The carboxyl functionality of the polyester resin can be in a terminal position on the polymer or in a pendant position in the polymer or in both terminal and pendant positions. The amino-functional silane can be one of many silanes having the general formula $NH_2R$-Si-$(OR_2)_3$. The addition of the polyester resin and the amino-functional silane can be accomplished in several different ways, where all of the silane is added to one or the other polyester resin, or where one portion that can vary in amount of the amino-functional silane in unhydrolyzed form can be added to one polyester resin in a polyester resin system while the remaining portion is added to the other polyester resin in the resin system. After the combination and reaction of the polyester resin or the polyester resin system with all or a portion of the amino-functional silane in unhydrolyzed form, the reaction product is diluted to discourage formation of a silanol dimer by addition to an aqueous medium containing water or water plus other additives. When the amino-functional silane is added to the polyester resin or polyester resin system, the resin or system must not have more than 90 percent water but can be in bulk form or in a concentrated solution having at least 10 percent water. The emulsion is then incorporated with other additives to form the sizing composition. The sizing composition will contain a silyated polyester resin or resins which can function as the film-former and the coupling agent.

We claim:

1. A stable aqueous emulsion for incorporation into a sizing composition for treating glass fibers, comprising:
    about 0.1 to about 10 parts per hundred parts of resin of unhydrolyzed amino-functional silane,
    one hundred parts of a polyester resin having free carboxyl functionality and having ethylenic unsaturation and where the polyester and silane are combined to favor the acid-base salt reaction between the free carboxyl groups of the polyester resin and the amine group of the silane over the formation of silane dimers by combination of hydrolyzed silanes, and
    an amount of water to produce an emulsion having a total solids content in the range of about 5 to about 20 weight percent.

2. A method of forming a stable emulsion for incorporation into a sizing composition for treating glass fibers, comprising:

combining an unhydrolyzed amino-functional silane with a polyester resin containing free carboxyl functionality and having ethylenic unsaturation to favor the acid-base salt reaction of the free carboxyl functionality of the polyester resin and the amine group of the silane over the formation of silane dimers by combination of hydrolyzed silanes to yield a reaction product, diluting the reaction to limit silane dimer formation and to produce an emulsion.

3. The method of claim 2 wherein the polyester resin having the carboxyl functionality is a polyester resin with terminal carboxyl functionality.

4. Method of claim 2 wherein the polyester resin with carboxyl functionality is a polyester resin having pendant carboxyl functionality.

5. Method of claim 2 wherein the polyester resin with carboxyl functionality is a polyester resin having pendant and terminal carboxyl functionality.

6. Method of claim 2 wherein the unhydrolyzed amino-silane is gamma aminopropyltrimethoxysilane.

7. Method of claim 2 wherein the dilution is performed by adding water.

8. Method of claim 2 wherein the dilution is performed by adding an aqueous medium containing emulsifying agent and plasticizer.

9. Method of claim 2 wherein the polyester resin is a combination of two polyester resins one having pendant carboxyl functionality and the other having terminal carboxyl functionality.

10. Method according to claim 9 wherein 25 percent of the unhydrolyzed amino-functional silane is added to the polyester resin with terminal carboxyl functionality while 75 percent of the unhydrolyzed amino-functional silane is added to the polyester resin with pendant carboxyl functionality.

11. Method according to claim 9 wherein 50 percent of the unhydrolyzed amino-silane is added to the polyester resin with terminal carboxyl functionality while 50 percent of the unhydrolyzed amino-functional silane is added to the polyester resin with the pendant carboxyl functionality.

12. Method according to claim 9 wherein 75 percent of the unhydrolyzed amino-functional silane is added to the polyester resin with terminal carboxyl functionality while 25 percent of the unhydrolyzed amino-functional silane is added to the polyester resin with pendant carboxyl functionality.

13. Method according to claim 2 or 9 wherein the stable emulsion is incorporated in a sizing composition.

14. A sizing composition for treating glass fibers, comprising:

a solubilized, condensed, crosslinkable, first unsaturated polyester resin having pendant carboxyl groups, said polyester resin substantially insoluble in aromatic solvents when crosslinked;

a second unsaturated water dispersible and insoluble polyester resin, said second polyester resin being insoluble in said first polyester resin in a water solution;

a plasticizer;

a first silane coupling agent that is an amino-functional silane in the unhydrolyzed state, which is combined with the first polyester resin to favor the acid-base salt reaction between the pendant carboxyl groups and the amine of the silane over the formation of silane dimers by combination of hydrolyzed amino silanes;

a thermoplastic polymer being of sufficiently low molecular weight to impart pressure sensitive adhesive characteristics to said sizing composition; and a major amount of water to give a total solids content in the range of about 5 to about 17 weight percent.

15. The emulsion of claim 1 wherein the unhydrolyzed amino-silane has been hydrolyzed to a partially hydrolyzed amino-silane or mixture of unhydrolyzed and partially hydrolyzed silane.

16. Method according to claim 2 wherein the unhydrolyzed amino-silane has been hydrolyzed to a partially hydrolyzed amino-silane or mixture of unhydrolyzed and partially hydrolyzed amino-silane.

17. Sizing composition according to claim 14 wherein the amino-functional silane has been hydrolyzed to a partially hydrolyzed silane or a mixture of unhydrolyzed and partially hydrolyzed silanes.

18. The method of claim 2 or 16 wherein the unhydrolyzed, partially hydrolyzed or mixture of unhydrolyzed and partially hydrolyzed amino-silane is combined with the polyester resin having free carboxyl functionality wherein the polyester resin has less than 90 percent water.

19. The emulsion of claim 1 wherein the polyester resin is in bulk form and is melted before the addition of the amino-functional silane.

20. The method of claim 2 wherein the polyester resin with free carboxyl or acid, saturated dicarboxylic acid and polyhydric alcohol.

21. The method of claim 2 wherein the amino-functional silane is a gamma-aminopropyltriethoxy silane.

22. Glass fiber strands treated with the sizing composition made by the method of claim 13.

23. Emulsion of claim 15 wherein the amino-silane is partially hydrolyzed more than unhydrolyzed and the polyester resin with free carboxyl functionality is present in aqueous solution at a concentration of at least 30 weight percent solids.

24. Method of claim 16 wherein the partially hydrolyzed or mixture of unhydrolyzed and partially hydrolyzed silane results from the combining of gamma-aminopropyltriethoxysilane to the polyester resin with less than 90 percent water.

25. The sizing composition of claim 14 or 19 wherein the unhydrolyzed or partially hydrolyzed amino-functional silane is combined with the second unsaturated polyester resin having less than 90 percent water.

26. A polymer acid-base salt interaction product of a polyester polymer having free carboxyl functionality and having unsaturation and of an unhydrolyzed, amino-silane is prepared by:

combining the unhydrolyzed amino-functional silane with the polyester resin having free carboxyl groups in the presence of less than 90 percent water at a temperature in the range of about 18° C. to about 50° C. and at atmospheric pressure.

27. The polymer acid-base salt interaction product of claim 26 wherein the unhydrolyzed amino-functional silane is partially hydrolyzed to partially hydrolyzed amino-silane or mixture of unhydrolyzed and partially hydrolyzed amino-silane and where said amino-functional silane is combined with the polyester resin with free carboxyl functionality that is present in aqueous solution at a concentration of at least 30 weight percent solids.

28. A polymer acid-base salt interaction product of a polyester polymer having free carboxyl functionality and having unsaturation, and of an unhydrolyzed, partially hydrolyzed amino-silane or mixture thereof prepared by:
  (a) melting the polyester polymer with free carboxyl functionality, and
  (b) combining the melted polymer with unhydrolyzed or partially hydrolyzed amino-silane or mixture thereof at a temperature in the range of about 18° C. to about 50° C. and at atmospheric pressure.

29. Sizing composition in accordance with claim 14 which includes a second silane coupling agent having a reactive moiety that is free radically polymerizable.

30. Sizing composition of claim 29 wherein the second silane coupling agent is gamma-methacryloxypropyltriethoxysilane.

31. Emulsion of claim 1 wherein the polyester resin is a combination of two polyester resins, one having pendant carboxyl functionality and the other having terminal carboxyl functionality.

32. A method of producing a more stable sizing composition that has a polyester resin having free carboxyl groups and an amino silane, comprising:
  a. combining an amino functional silane that is unhydrolyzed, partially hydrolyzed, or mixture thereof with the polyester resin having free carboxyl functionality and having ethylenic unsaturation in the presence of less than 90 percent water to favor the production of the acid-base salt reaction product,
  b. combining with the reaction product an emulsifier, plasticizer, and additional polyester resin alone or in combination to produce an emulsion,
  c. hydrolyzing a vinyl-containing silane coupling agent with acetic acid and add to product of step b,
  d. diluting a thermoplastic polymer in water and add to the product of step c, and
  e. diluting with water to the desired solids content in the range of about 5 to about 17 weight percent.

33. Method of claim 32 wherein the polyester resin with free carboxyl functionality is prepared from a trimellitic acid or anhydride.

34. Method of preparing a more stable aqueous sizing composition that contains two unsaturated polyester resins, the first unsaturated polyester resin having pendant carboxyl groups and the second unsaturated polyester resin having terminal carboxyl groups and an amino silane, comprising:
  a. combining the amino silane in a state of unhydrolyzation, partial hydrolyzation, or mixture thereof with the second unsaturated polyester resin in the presence of less than 90 percent water, to produce an acid-base salt reaction product between the unhydrolyzed and/or partially hydrolyzed amino silane and carboxyl functionality of the polyester,
  b. adding a plasticizer and emulsifier and water to the mixture of step (a);
  c. adding the first unsaturated polyester resin with pendant carboxyl groups to the emulsion to produce an acid-base salt reaction product with the unhydrolyzed and/or partially hydrolyzed amino silane in the emulsion,
  d. hydrolyzing a vinyl-containing silane coupling agent with acetic acid and adding to the emulsion,
  e. diluting a thermoplastic polymeric additive in water and adding to the emulsion, and
  f. diluting the mixture to the desired solids in the range of about 5 to about 17 weight percent.

35. Method of claims 32 or 34 wherein a portion of the amine silane that is unhydrolyzed, partially hydrolyzed, or a mixture of unhydrolyzed and partially hydrolyzed is added to the first unsaturated polyester resin with pendant carboxyl groups while the other portion is added to the second unsaturated polyester resin with terminal carboxyl groups.

36. Method according to claims 9 or 16 wherein the amino-functional silane selected from the group consisting of unhydrolyzed or partially hydrolyzed or a mixture of partially hydrolyzed and unhydrolyzed amino silane is added to the polyester resin having terminal carboxyl functionality, and the combination is combined with the polyester resin having pendant carboxyl functionality.

37. Method according to claims 9 or 16 wherein the amino-functional silane selected from the group consisting of unhydrolyzed, partially hydrolyzed or a mixture of unhydrolyzed and partially hydrolyzed amino-functional silane is added to the polyester resin with pendant carboxyl functionality, and the combination is combined with the polyester resin having terminal carboxyl functionality.

38. The method of claim 2 wherein the polyester resin is in bulk form and is melted before the addition of the aminofunctional silane.

39. The sizing composition of claim 14 wherein the polyester resin with free carboxyl functionality is prepared with trimellitic acid or anhydride, maleic anhydride or acid, saturated dicarboxylic acid and polyhydric alcohol.

40. Sizing composition of claim 14 wherein the amino-functional silane is a gamma-aminopropyltriethoxy silane.

41. Glass fiber strands treated with the sizing composition of claim 14.

42. Method of claim 16 wherein the amino silane is partially hydrolyzed more than unhydrolyzed and the polyester resin with free carboxyl functionality is present in aqueous solution at a concentration of at least 30 weight percent solids.

43. The emulsion of claim 1 wherein the polyester resin having carboxyl functionality is a polyester resin with terminal carboxyl functionality.

44. Emulsion of claim 1 wherein the polyester resin with carboxyl functionality is a polyester resin having pendant carboxyl functionality.

45. Emulsion of claim 1 wherein the polyester resin with carboxyl functionality is a polyester resin having pendant and terminal carboxyl functionality.

* * * * *